United States Patent
Satish

(10) Patent No.: US 8,533,842 B1
(45) Date of Patent: Sep. 10, 2013

(54) METHOD AND APPARATUS FOR EVALUATING INTERNET RESOURCES USING A COMPUTER HEALTH METRIC

(75) Inventor: Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 1170 days.

(21) Appl. No.: 12/044,418

(22) Filed: Mar. 7, 2008

(51) Int. Cl.
*G06F 11/00* (2006.01)

(52) U.S. Cl.
USPC .............................................. 726/25; 726/22

(58) Field of Classification Search
USPC .......................... 726/22–25, 11–13; 713/188
See application file for complete search history.

(56) References Cited

U.S. PATENT DOCUMENTS

| | | | |
|---|---|---|---|
| 6,615,259 B1* | 9/2003 | Nguyen et al. | 709/224 |
| 7,243,148 B2* | 7/2007 | Keir et al. | 709/224 |
| 7,257,630 B2* | 8/2007 | Cole et al. | 709/224 |
| 7,832,013 B2* | 11/2010 | Park et al. | 726/25 |
| 7,865,953 B1* | 1/2011 | Hsieh et al. | 726/22 |
| 2003/0028803 A1* | 2/2003 | Bunker et al. | 713/201 |
| 2005/0188423 A1* | 8/2005 | Motsinger et al. | 726/22 |
| 2008/0010683 A1* | 1/2008 | Baddour et al. | 726/24 |
| 2008/0127338 A1* | 5/2008 | Cho et al. | 726/22 |

* cited by examiner

*Primary Examiner* — Nirav B Patel
(74) *Attorney, Agent, or Firm* — Wilmer Cutler Pickering Hale and Dorr LLP

(57) ABSTRACT

A method for assessing network safety using a computer health metric comprises processing internet resource information, wherein a portion of the internet resource information comprises one or more internet resources that were accessed during a period of network activity associated with an impact on a computer health and analyzing one or more internet resource to determine a candidate internet resource, wherein a candidate internet resource is related to the impact on computer health.

11 Claims, 4 Drawing Sheets

METHOD AND APPARATUS FOR EVALUATING INTERNET RESOURCES USING A COMPUTER HEALTH METRIC

BACKGROUND OF THE INVENTION

1. Field of the Invention

Embodiments of the present invention generally relate to computer security systems and, more particularly, to a method and apparatus for evaluating internet resources for any potential threats using a computer health metric.

2. Description of the Related Art

Currently, computer networks, such as the internet are widely used to access various resources (i.e., internet resources) available across a plurality of networked computers. Such internet resources include web pages (e.g., Hypertext Markup Language (HTML) documents), virtual private networks, online services, games, web applications, databases, domains and the like. A user of a computing device (e.g., a laptop, a Personal Desk Assistant (PDA) and the like) may access one or more internet resources through a browser application that is configured to interact with the internet resources. For example, the browser application may process documents and instructions associated with the internet resources and present such documents to the user through a browser window. Accordingly, the user may visit and exchange data with the internet resources through the browser application.

The internet resources, however, can also pose a potential threat to the computer of the user. For example, malware may reside within a particular internet resource awaiting an opportunity to attack the computer. Generally, malware includes malicious code designed to disrupt, destroy and/or exert control over the computer. Occasionally, the user may download the malware onto the computer through the browser application upon a visit to the particular internet resource. The malware impacts the system health of the computer (e.g., degrades performance and stability of the computer). The performance and stability of the computer may degrade in terms of an overloaded processor, an increase in a number of page faults, an increase in disk access latency, a decrease in a data transfer rate associated with a hardware device (e.g., data storage device, processor among others), a decrease in available network bandwidth and/or the like.

According to one of the prevalent methods, internet resources are examined for safe use by the public through the use of security programs that evaluate such internet resources for any potential threats, such as malware, viruses, phish and the like. If a particular internet resource comprises one or more potential threats to the user, the particular internet resource receives a rating/score that indicates an unsafe internet resource. Any user that navigates to the particular internet resource will be warned or stopped altogether.

According to yet another method, a crawler program extracts and processes content hosted by the particular internet resource in order to determine whether the particular internet resource includes malware. Accordingly, the crawler program assigns a rate/score to the particular internet resource indicating a level of safety based on the evaluated content. However, the above mentioned methods operate under the incorrect assumption that malware detection technologies, such as heuristics based approaches and signature based approaches, are errorless. Furthermore, the ratings may be spoofed by an internet resource such that the ratings are made intentionally erroneous. As a result, the user ends up navigating to unsafe internet resources and/or downloads content that includes malware due to erroneous ratings.

Accordingly, there is a need in the art for a method and apparatus for evaluating internet resources for any potential threats using a computer health metric.

SUMMARY

Embodiments of the present invention comprise a method and apparatus of assessing network safety using a computer health metric. In one embodiment, a method comprising processing internet resource information, wherein a portion of the internet resource information comprises one or more internet resources that are accessed during a period of network activity associated with an impact on a computer health and analyzing one or more internet resource to determine a candidate internet resource, wherein a candidate internet resource is related to the impact on computer health.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
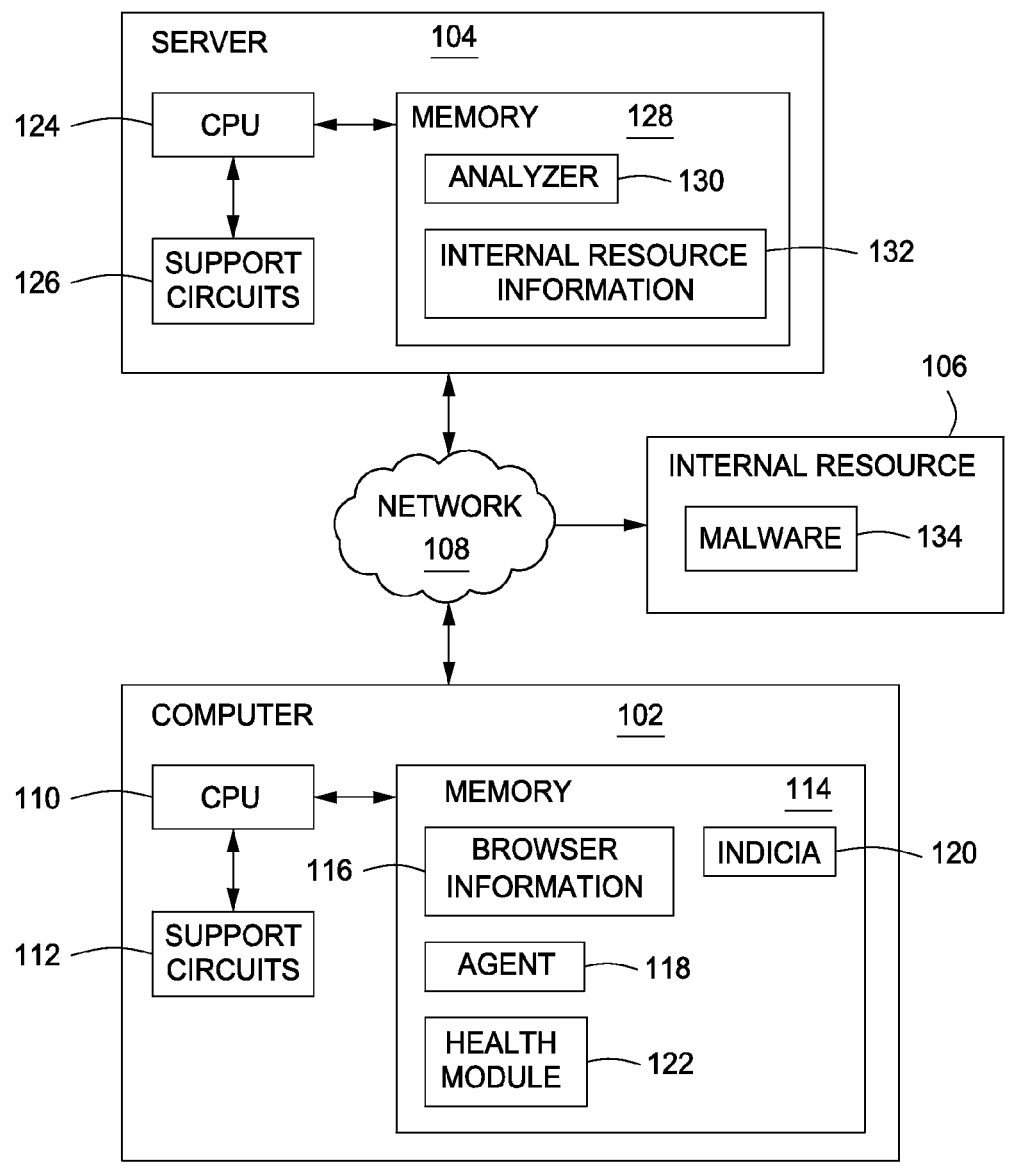
FIG. 1 is a block diagram of a system for evaluating internet resources using a health scoring technique in accordance with one or more embodiments.

FIG. 1 is a block diagram of a system 100 for evaluating internet resources using a health scoring technique. The system 100 comprises a server 104, a computer 102 and an internet resource 106, each coupled to one another through a network 108.

The computer 102 comprises a computing device (e.g., laptop, desktop, Personal Desk Assistant (PDA) and the like). The computer 102 further comprises a central processing unit (CPU) 110, various support circuits 112 and a memory 114. The CPU 110 may comprise one or more commercially available microprocessors or microcontrollers that facilitate data processing and storage. The support circuits 112 facilitate the operation of the CPU 110 and comprise at least one of clock circuits, power supplies, cache, input/output circuits and the like. The memory 114 comprises at least one of read only memory (ROM), random access memory (RAM), disk drive storage, optical storage, removable storage and the like. The memory 114 includes various data, such as browser information 116 and indicia 120. The memory 114 further includes various software packages, such as a health module 122 and an agent 118.

The server 104 comprises a central processing unit (CPU) 124, various support circuits 126, and a memory 128. The CPU 124 may comprise one or more commercially available microprocessors or microcontrollers that facilitate data processing and storage. The various support circuits 126 facilitate the operation of the CPU 124 and comprise at least one of clock circuits, power supplies, cache, input/output circuits, and the like. The memory 128 comprises at least one of read only memory (ROM), random access memory (RAM), disk drive storage, optical storage, removable storage, and the like. The memory 128 further includes various software packages, such as an analyzer 130. The memory 128 further includes various data, such as internet resource information 132. The internet resource information 132 comprises a number of internet resources, as explained further below.

The internet resource 106 comprises one or more web pages, various content (e.g., dynamic or static content in the form of images, video and/or audio), online services (e.g., social networking), applications, databases and/or the like. The internet resource 106 may be referenced by a URL (Uniform Resource Locator) or a domain name (e.g., www.uspto.gov). The internet resource 106 is accessed by the user of the computer 102 through a browser application. The internet resource 106 may further include various programs and/or content available for download by the user. In one embodiment, the internet resource 106 further comprises a malware 134. Generally, the malware 134 includes malicious code that is configured to degrade the system health (e.g., performance and stability) of the computer 102. For example, operations associated with the malware 134 consume a significant portion of available resources at the computer 102 (e.g., processors, memory devices, network components and the like), which prevents legitimate and/or critical software applications from using such resources. Such software applications cannot perform certain important tasks, which leaves the computer 102 vulnerable to problems, such as an attack from the malware 134, a system crash or a hard drive disk failure.

The browser information 116 indicates a number of internet resources (e.g., the internet resource 106) accessed by the user of the computer 102 within a particular time period of network activity (i.e., internet browsing). In one embodiment, the browser information 116 comprises one or more URLs and/or domain names visited by the user. The indicia 120 refers to one or more indicators of an impact on an overall system health of the computer 102 during the time period of the network activity, such as a significant and/or sudden drop in health scores associated with accessing (e.g., visiting) the internet resource 106 and downloading the malware 134.

The network 108 comprises a communication system that connects a computer system by wire, cable, fiber optic and/or wireless link facilitated by various types of well-known network elements, such as hubs, switches, routers, and the like. The network 108 may employ various well-known protocols to communicate information amongst the network resources. For example, the network 108 may be a part of the internet or intranet using various communication infrastructures such as Ethernet, WiFi, WiMax, General Packet Radio Service (GPRS), and the like.

Generally, the health module 122 evaluates several factors (e.g., performance and stability factors) regarding various system and computing resources (e.g., processors, networking components, computer memory, data storage devices and the like) which influence computer health and productivity. The health module 122 cooperates with the agent 118 to monitor levels, peaks and degree of variations of such performance and stability factors in order to determine the system health of the computer 102. The health module 122 employs a health scoring technique to compute health scores for the computer 102. Furthermore, the health module 122 employs a computer health metric to calculate differences or distances between two or more health scores. The computer health metric is a standard by which the impact on the overall health of the computer 102 during a particular time period is measured. Accordingly, such differences may form a portion of the indicia 120 of the impact on the health of the computer 102.

Generally, the system health of the computer 102 is defined by various stability and performance measurements. As explained further below, the agent 118 gathers the various stability and performance measurements and monitors changes in the system health of the computer 102 during a measurement cycle. For example, stability measurements include frequencies of system and application crashes, device or service failures, driver failures, logged application or device errors and the like. As another example, performance measurements include computer boot time, time from system start to user logon query, time from logon query to desktop display, application start/run times, time to complete file reads/writes of data blocks, Input/Output level bottleneck statistics, average system/application CPU utilization, average system/application network I/O utilization, memory utilization, hard and soft page fault rate, paged and non-paged pool peaks and peek hit rate, CPU interrupt rate and the like.

Accordingly, the health score may be computed as a sum of all the averages of various performance and stability measurements taken at various iterations in the operation of the computer 102. The health score is influenced by changes to the software configuration and/or hardware configuration changes (e.g., installation, operation and/or removal of software applications and/or hardware devices). The health scores are normalized and a difference between the normalized health scores indicates an impact on the system health of the computer 102 during one or more iterations. Accordingly, normalization of the health scores enables a comparison between two or more health scores. In one embodiment, the health score is normalized by iteration count, iteration length, installed software applications, system hardware configuration changes and/or the like.

The execution or lack of execution of the application and/or associated components may be used to further normalize the health scores. The lack of execution of the application and/or associated components during the measurement cycle reflects indirect influence of the application on the system health where the installation may have changed some system wide settings, environment variables, OS settings and the like. The execution of the application and/or associated components during the measurement cycle reflects direct influence of the application on the system health (e.g., incompatibility, system resource contentions and the like), which may influence other applications on the computer 102 and/or the installed application.

The agent 118 is configured to utilize one or more health scores to determine the indicia 120 of the impact on the health of the computer 102 associated with visiting the internet resource 106 and/or accessing the malware 134. In one embodiment, differences between two or more health scores are evaluated by the agent 118 to determine the indicia 120. As such, the agent 118 may determine the indicia 120 to be a significant and/or sudden degradation or drop in health scores beyond a threshold over a particular period of time 120. Moreover, the indicia 120 may also be a significant and/or sudden spike in resource activity (e.g., an increase in Input/Output activity (e.g., I/O operations through the network 108), processor usage and the like). Furthermore, the indicia 120 may be an occurrence of one or more events (e.g., I/O errors, page faults, buffer overflows, memory leaks, segmentation faults, security alerts and the like). Additionally, the indicia 120 may be an increase or decrease of a rate in which the events occur (e.g., error rates, data packet acknowledgments, security event rates and the like). Accordingly, the agent 118 uses the indicia 120 to determine if the visit to the internet resource 106 impacted the health of the computer 102.

The agent 118 is further configured to generate a portion of the internet resource information 132 based on the indicia 120. According to one or more embodiments, the agent 118 ignores the indicia 120 (i.e., the sudden degradation in health scores) if there is activity that reasonably explains the sudden degradation (e.g., installation and/or utilization of a new software package or a hardware device). However, if there is no new software or hardware installed or utilized, then the sudden drop in the health scores indicates the arrival of the malware 134 on the computer 102. In one or more embodiments, the agent 118 collects a number of URLs and domain names accessed during the sudden drop in the health scores, from the browser information 116 and/or the Domain Naming Service resolver cache. Accordingly, the collected number of URLs and domains names are associated with the impact on the health of the computer 102. In a further embodiment, the agent 118 communicates the URLs and the domain names to the server 104 for storage as a portion of the internet resource information 132.

In another embodiment, the agent 118 computes a running average health score and a current health score for each iteration during the particular time period. The running average health score may be computed on the basis of the current health score and one or more prior health scores. By the way of example, and not limitation, the current health score and running average score are computed every five minutes. If a sudden degradation in system health beyond a certain threshold is observed for the computer 102 over the last five minutes, then the agent 118 collects URLs and domain names visited during the last five minutes from the browser information 116. Optionally, the agent 118 can also collect domain names from the Domain Name Service Resolver Cache. The agent 118 communicates the collected information to the server 104. The agent 118 is further configured to detect in-browser malware which may never touch the hard disk drive and hence, may remain undetectable to conventional malware detection techniques but still will cause a difference in health scores.

According to various embodiments, the system 100 comprises a plurality of computers that includes the computer 102. The analyzer 130 stored and executed within the server 104 processes the internet resource information 132 from the plurality of computers to determine one or more candidate internet resources (i.e., URLs or the domain names) that have the highest probability of system health degradation. Such URLs and domain names are candidates for a further evaluation by an internet resource evaluation program, such as a malware detection technique. In one or more embodiments, the analyzer 130 compares various portions of the internet resource information 132 to determine the one or more candidate internet resources (i.e., URLs and the domain names) where each portion comprises a number of internet resources provided by a computer of the plurality of computers. In one embodiment, the one or more candidate internet resources intersect a significant number of the various portions of the internet resource information 132. Such URLs and the domain names are reliable candidates because they are associated with sudden drops in system health across a plurality of computers. Hence, the determination of the reliable candidate internet resources is confirmed by the plurality of computers and is not dependent on only a few computers. In other words, the analyzer 130 selects one or more internet resources as the one or more candidate internet resources if a significant number of computers associate the one or more internet resources with an impact on a system health.

Figure 2:
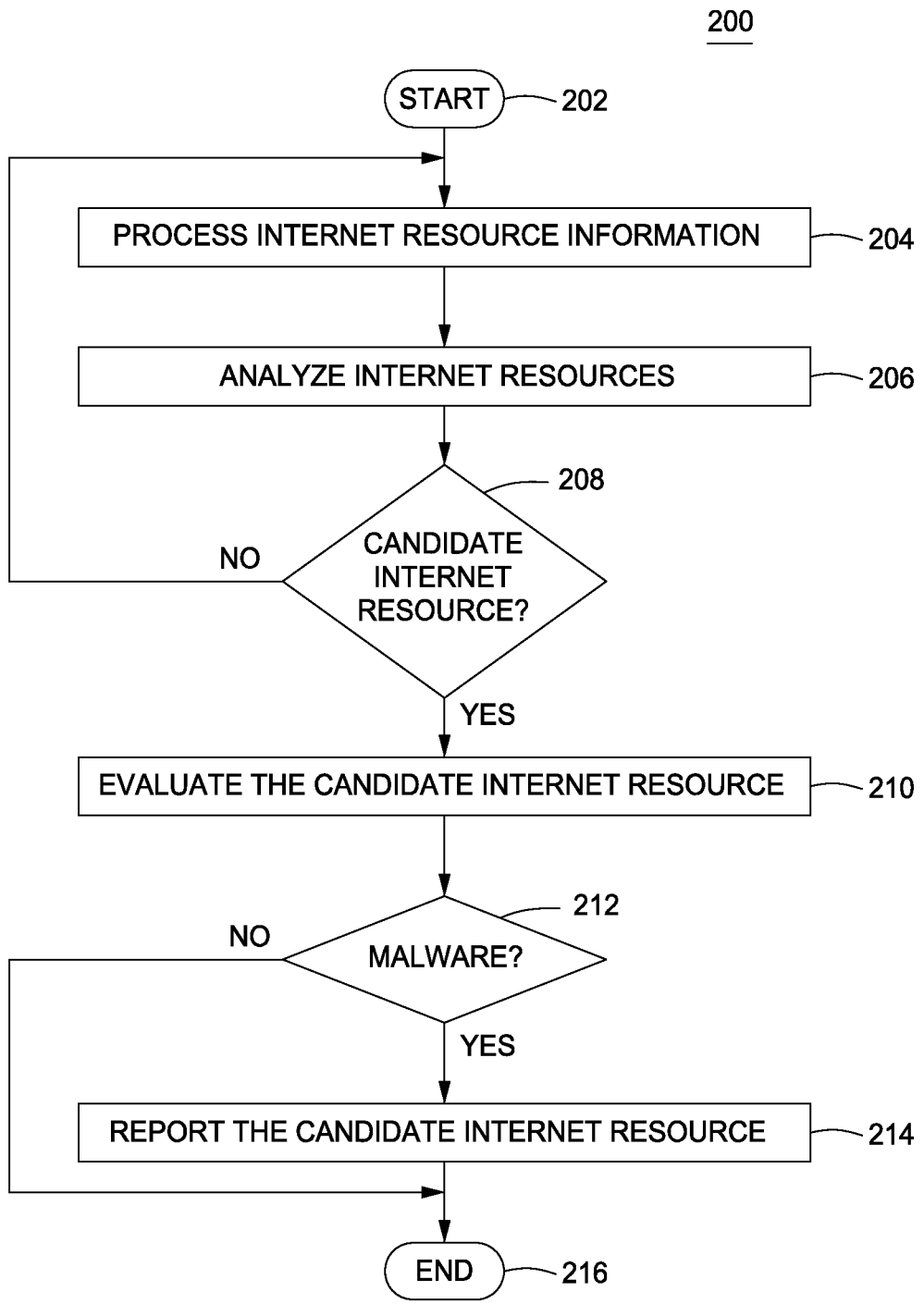
FIG. 2 is a flow diagram of a method for evaluating internet resources using a health scoring technique in accordance with one or more embodiments.

FIG. 2 illustrates a method 200 for evaluating internet resources using a health scoring technique, in accordance with one or more embodiments of the invention. The method 200 starts at step 202 and proceeds to step 204, at which internet resource information (e.g., the internet resource information 132 of FIG. 1) is processed (e.g., by the analyzer 130 of FIG. 1). As explained above, each portion of the internet resource information comprises one or more internet resources associated with indicia of an impact on a health of a computer (e.g., the indicia 120 of FIG. 1) of a plurality of computers.

At step 206, the internet resources from the plurality of computers are analyzed to determine one or more candidate internet resources. At step 208, a determination is made as to whether one or more internet resources are candidate internet resources (e.g., URLs or domain names). If it is determined that there are the one or more candidate internet resources (option "YES") then the method 200 proceeds to step 210. If, at step 208, it is determined that there are no candidate internet resources (option "NO") then the method 200 returns to step 204.

In one embodiment, the analyzer 130 compares various portions of the internet resource information to determine one or more candidate internet resources (e.g., URLs and domain names) that have the highest probability of system health degradation. For example, the analyzer 130 compares various portions of the internet resource information to determine the URL's and domain names that intersect a significant number of portions. Such URLs and domain names are reliable candidate internet resources because the URLs and domain names were accessed during a plurality of time periods of network activity associated with a plurality of impacts on a system health of a significant number of computers of the plurality of computers. For example, the URLs and domain names were accessed or visited during sudden drops in health scores at the significant number of computers.

At step 210, the one or more candidate internet resources are evaluated. In one embodiment, various malware detection techniques are applied to the one or more candidate internet resources. At step 212, a determination is made as to whether any of the one or more candidate internet resources includes malware (e.g., the malware 134 of FIG. 1). If it is determined that a candidate internet resource includes the malware (option "YES") then the method 200 proceeds to step 214. At step 214, the method 200 reports the candidate internet resource as a potential threat. If, at step 212, it is determined that the candidate internet resource is not the malware (option "NO") then the method 200 proceeds to step 216. The method 200 ends at step 216.

Figure 3:
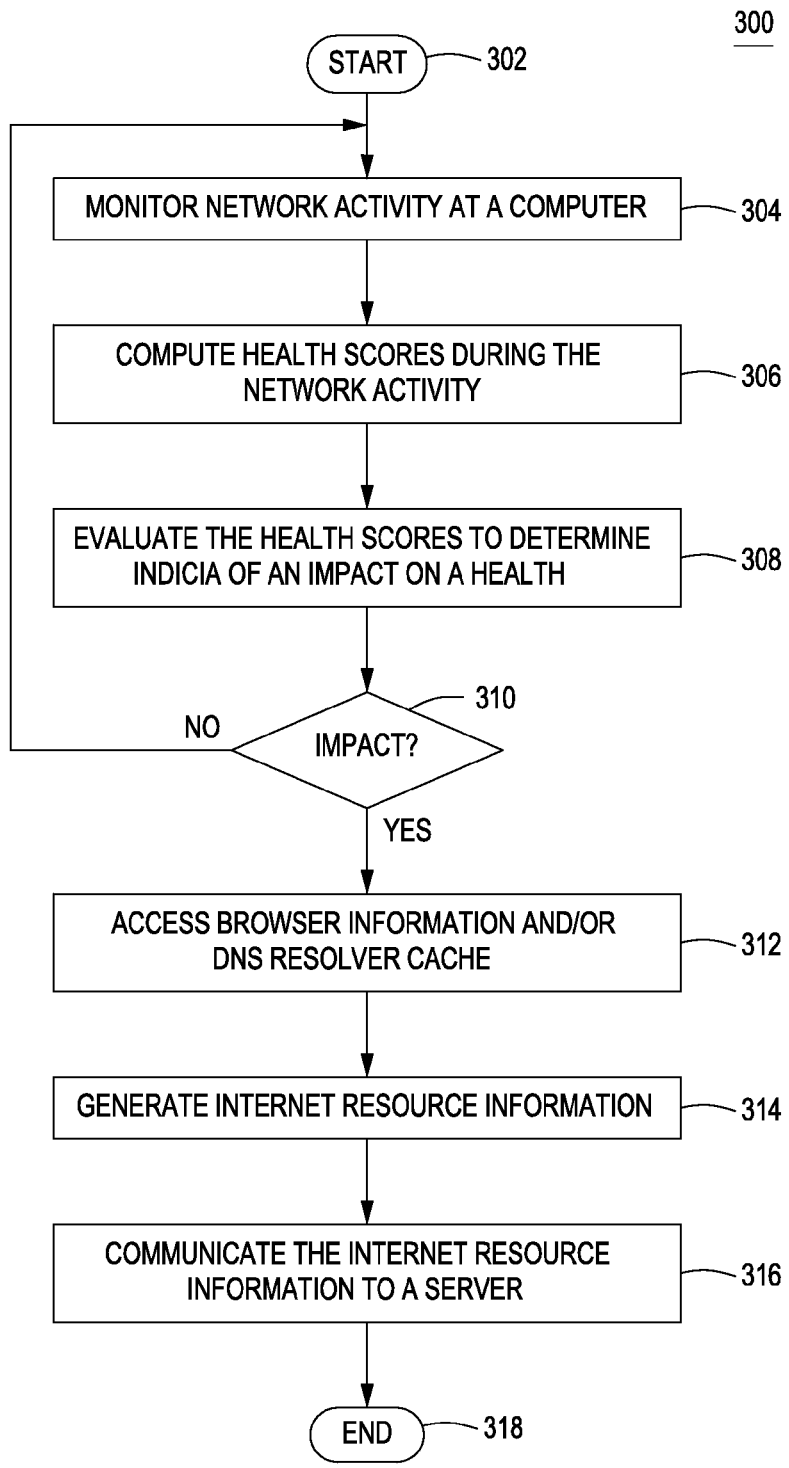
FIG. 3 is a flow diagram of a method of generating internet resource information in accordance with one or more embodiments.

FIG. 3 illustrates a method 300 of generating internet resource information, in accordance with one or more embodiments of the present invention. The method 300 starts at step 302 and proceeds to step 304, at which network activity (e.g., internet browsing) at a computer is monitored (e.g., by the agent 118 of FIG. 1). At step 306, one or more health scores are computed during the network activity. At step 308, the one or more health scores are evaluated to determine indicia of an impact on the health of the computer (e.g., indicia 120 of FIG. 1). The steps 306 and 308 are discussed further with respect to FIG. 4.

At step 310, a determination is made as to whether there the health of the computer has been impacted by visiting one or more internet resources during a period of the network activity based on the indicia. If it is determined that there the health of the computer has been impacted (option "YES") then the method 300 proceeds to step 312. If, at step 310, it is determined that the health of the computer has not been impacted, then the method 300 returns to step 304. For example, the indicia may be a sudden degradation in the health scores beyond a threshold over a short period of time. The sudden degradation, however, may be a result of an installation of new software packages and not related to malware or any other potential threat to the health of the computer.

At step 312, browser information (e.g., the browser information 116 of FIG. 1) and/or DNS resolver cache is accessed to identify one or more internet resources that were visited during the period of the network activity associated with the impact on the health of the computer. In one embodiment, the agent 118 collects a number of URLs and domain names accessed during the period of network activity associated with the sudden drop of the health scores. At step 314, the internet resource information is generated from one or more identified internet resources. At step 316, the internet resource information (e.g., URLs and domain names) is communicated to a server (e.g., the server 104) for storage (e.g., as the internet resource information 132 of FIG. 1). The method 300 ends at step 318.

Figure 4:
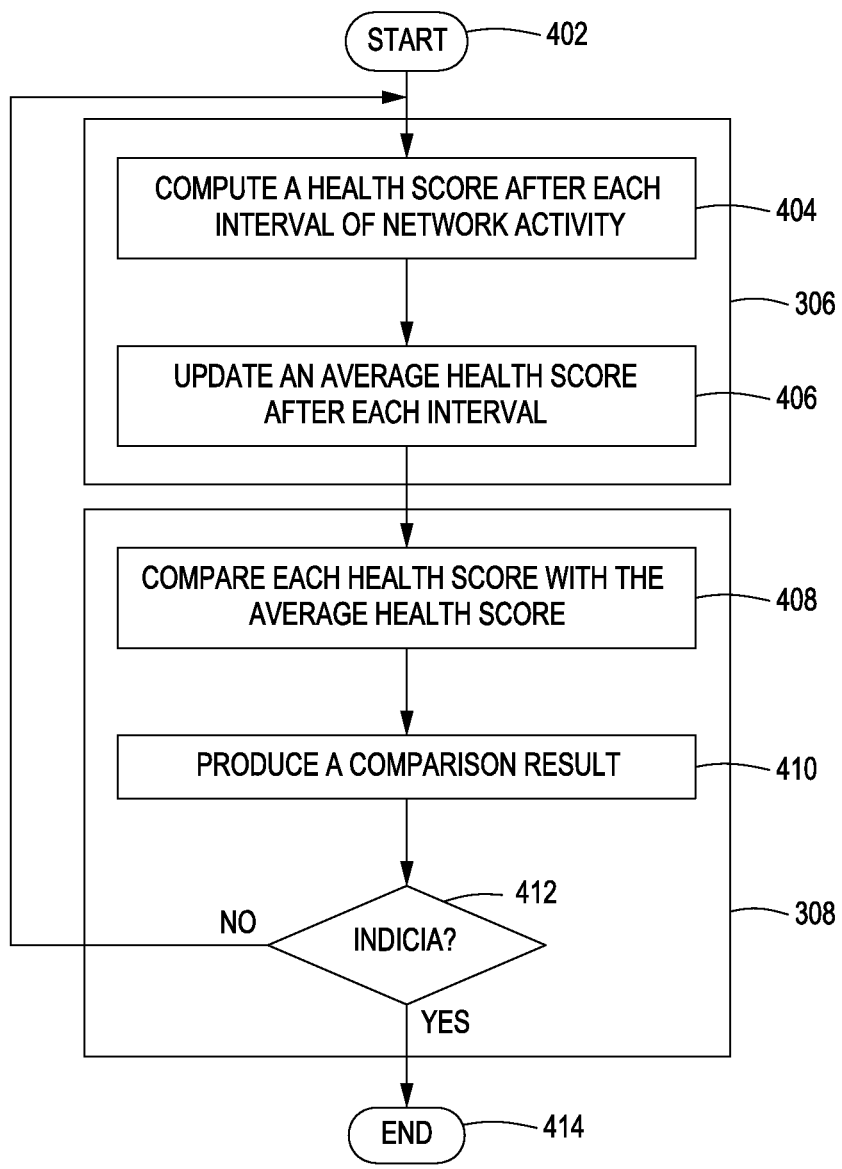
FIG. 4 is a flow diagram of a method of comparing two or more health scores to determine indicia of an impact on a computer health in accordance with one or more embodiments.

FIG. 4 illustrates a method 400 of computing two or more health scores to determine indicia of an impact on a health of a computer. The method 400 starts at step 402 and proceeds to step 404, at which a health score is computer after each interval of network activity (e.g., by the health module 122 of FIG. 1). At step 406, an average health score is updated after each interval. At step 408, the health score is compared with the average health score. At step 410, a comparison result is produced (e.g., by the agent 118 of FIG. 1).

At step 412, a determination is made as to whether the comparison result constitutes the indicia of the impact on the health of the computer. If it is determined that the comparison result constitutes the indicia (option "YES") then the method 400 proceeds to step 414. If, at step 412, it is determined that the comparison result does not constitute the indicia then method 400 returns to step 404. The method 400 ends at step 414.

While the foregoing is directed to embodiments of the present invention, other and further embodiments of the invention may be devised without departing from the basic scope thereof, and the scope thereof is determined by the claims that follow.

The invention claimed is:

1. A method of assessing network safety using a computer health metric, comprising:

receiving, from a plurality of computers, internet resource information, wherein a portion of the internet resource information comprises a plurality of internet resources accessed by one or more of the plurality of computers during a period of network activity associated with an impact on computer health;

selecting one or more candidate internet resources from the plurality of internet resources based on the one or more candidate internet resources being associated with the impact on computer health by an amount of the one or more of the plurality of computers; and evaluating at least one health score associated with at least one period of network activity performed at one or more of the plurality of computers, wherein the at least one health score is configured to determine indicia of the impact on computer health during the least one period of network activity and evaluating the at least one health score comprises at least:

computing a health score for each portion of various portions of the network activity and an average health score for at least two portions of the network activity;

comparing the health score for each portion with the average health score to produce a comparison result; and determining the indicia of the impact on computer health based on the comparison result.

2. The method of claim 1, wherein the plurality of internet resources include a plurality of Uniform Resource Locators or domain names.

3. The method of claim 1 further comprising evaluating the one or more candidate internet resources to determine a cause of the impact on computer health.

4. The method of claim 3 further comprising identifying malware associated with the one or more candidate internet resources.

5. The method of claim 1, wherein selecting the one or more candidate internet resources further comprises selecting one or more internet resources having a highest probability of reducing computer health amongst the plurality of internet resources as the one or more candidate internet resources.

6. The method of claim 1, further comprising identifying at least one webpage accessed during the at least one portion of the network activity from browser information.

7. The method of claim 1, further comprising identifying at least one domain name accessed during the at least one portion of the network activity from a Domain Name Service cache.

8. The method of claim 1, wherein selecting the one or more candidate internet resources further comprises comparing various portions of the internet resource information to determine the one or more candidate internet resources.

9. An apparatus for assessing network safety using a computer health metric, comprising:

a memory configured to store internet resource information from a plurality of computers, wherein a portion of the internet resource information comprises a plurality of internet resources accessed by one or more of the plurality of computers during a portion of network activity associated with an impact on computer health;

an analyzer configured to select one or more candidate internet resources from the plurality of internet resources based on the one or more candidate internet resources being associated with the impact on computer health by an amount of the one or more of the plurality of computers;

an agent configured to evaluate at least one health score associated with at least one portion of the network activity performed at one or more of the plurality of computers, wherein the agent is configured to determine indicia of the impact on computer health during the at least one portion of the network activity; and a health module configured to compute a health score for each portion of various portions of the network activity and an average health score for at least two portions of the network activity;

wherein the agent is further configured to:

compare the health score for each portion with the average health score to produce a comparison result; and determines the indicia of the impact on computer health based on the comparison result.

10. The apparatus of claim 9, wherein the analyzer compares various portions of the internet resource information to determine the one or more candidate internet resources.

11. A system for assessing network safety using a computer health metric, comprising:
- a plurality of computers configured to perform network activity, wherein each computer comprising:
    - an agent configured to evaluate at least one health score associated with at least one period of network activity to determine indicia of an impact on a computer health for the each computer during the at least one period of network activity and identifying a plurality of internet resources accessed during the at least one period of network activity; and
    - a health module configured to compute the at least one health score for each period of the network activity and an average health score for at least two periods of the network activity;
    - wherein the agent is further configured to compare the health score for each period with the average health score to produce a comparison result and determine the indicia of the impact on the computer health based on the comparison result; and
- a server, comprising:
    - an analyzer configured to store the plurality of internet resources as a portion of internet resource information and comparing various portions of the internet resource information to select one or more candidate internet resources from the plurality of internet resources based on the one or more candidate internet resources being associated with a highest probability of computer health degradation.

* * * * *